(12) United States Patent
Karp et al.

(10) Patent No.: US 6,712,302 B2
(45) Date of Patent: Mar. 30, 2004

(54) DELTA VELOCITY TENSION CONTROL FOR TAPE

(75) Inventors: James Mitchell Karp, Tucson, AZ (US); John Alexander Koski, Livermore, CA (US); Steven Carter Wills, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/233,494

(22) Filed: Sep. 4, 2002

(65) Prior Publication Data

US 2004/0041048 A1 Mar. 4, 2004

(51) Int. Cl.[7] ............................................... G11B 15/46
(52) U.S. Cl. ............................. 242/334.4; 242/334.3; 242/334.6; 360/71
(58) Field of Search ............................ 242/334.3, 334.4, 242/334.6; 360/71

(56) References Cited

U.S. PATENT DOCUMENTS

| | | | |
|---|---|---|---|
| 3,606,201 A | 9/1971 | Petusky | 242/190 |
| 3,809,335 A | 5/1974 | Mantey | 242/186 |
| 3,913,866 A | 10/1975 | Hankins | 242/191 |
| 4,015,799 A | 4/1977 | Koski et al. | 242/203 |
| 4,400,745 A | 8/1983 | Shu | 360/73 |
| 4,807,107 A | 2/1989 | Fincher | 364/148 |
| 5,039,027 A | 8/1991 | Yanagihara et al. | 242/190 |
| 5,277,378 A | 1/1994 | Ebisawa | 242/190 |
| 5,282,586 A | 2/1994 | Suzuki et al. | 242/190 |
| 5,836,533 A | 11/1998 | Hallamasek | 243/334.6 |
| 5,860,610 A | 1/1999 | Nishida et al. | 242/334.2 |
| 5,921,493 A | 7/1999 | Kohno | 242/334.3 |
| 6,305,629 B1 | 10/2001 | Chliwnyj et al. | 242/334.3 |

FOREIGN PATENT DOCUMENTS

| | | | |
|---|---|---|---|
| JP | 62051061 | 3/1987 | G11B/15/43 |
| JP | 3-171459 | 7/1991 | G11B/15/46 |
| JP | 4178948 | 6/1992 | G11B/15/43 |
| JP | 6349153 | 12/1994 | G11B/15/43 |
| JP | 8167201 | 6/1996 | G11B/15/46 |

*Primary Examiner*—John Q. Nguyen
(74) *Attorney, Agent, or Firm*—John H. Holcombe (57) ABSTRACT

Dynamic tension control for tape transported along a tape path between supply and take-up reels, driven by supply and take-up reel motors. Rotational angular velocities of the supply and take-up reels are determined from tachometers, and therefrom a linear speed for the tape at the supply reel, and a linear speed for the tape at the take-up reel are each determined. The tape linear speeds at the reels are compared to determine a delta velocity between the linear speeds. The motors are operated in accordance with a function of the delta velocity to provide a torque to at least one of the reels tending to reduce the delta velocity.

25 Claims, 2 Drawing Sheets

FIG. 1

Delta Velocity Response

DELTA VELOCITY TENSION CONTROL FOR TAPE

FIELD OF THE INVENTION

This invention relates to the transport of tape between reels, and, more particularly, to tension control of tape during direct transport between the reels without significant buffering of the tape.

BACKGROUND OF THE INVENTION

A tape that is directly transported between a supply reel and a take-up reel requires precise control of the tape tension to provide smooth constant tape speed, and, if the tape is to be accelerated and decelerated, to provide smooth acceleration and deceleration of the tape, and to prevent damage to the tape. One example of a direct tape transport is a magnetic tape drive, in which a magnetic tape is transported along a tape path past a read/write head located in the tape path, such that the magnetic read/write head may read and/or write data on the magnetic tape, and the magnetic tape is stopped and started to read and/or write data at desired locations of the magnetic tape. Another example of a direct tape transport is a printing press in which a tape (paper web) is transported between reels past printing rolls under precise timing, and new rolls of paper web must be accelerated to speed smoothly without damage and without smudging at the printing rolls. Herein, the term "tape" is defined as comprising tape or web in any suitable elongate form; the term "reel" is defined as comprising a reel or spool that is removable or permanent, and provides the spool or axis at which the tape is wound and/or unwound; and the terms "supply" and "take-up" reels refer to the two reels of a two reel system, typically respectively from which the tape originates and to which the tape is directed, but the tape may be wound and unwound with respect to either reel in a bi-directional fashion.

One or more electromechanical tape tension transducers can be mounted in the tape path to monitor tape tension, and the supply and/or take-up reel motors are controlled to provide a nominal tape tension and to tend to offset errors in tape tension. Examples of tape tension transducers comprise U.S. Pat. Nos. 5,282,586, 5,277,378, 5,039,027, 4,807,107, and 3,606,201, all of which illustrate the use of tension arms. U.S. Pat. No. 3,809,335 indicates that other types of sensors may also be used, such as a pressure responsive air jet or bearing, or a load cell. Another example of a tape tension transducer is a direct sensing pressure transducer. However, a delicate balance is maintained in designing tape tension transducers to both be robust and reliable, yet also to be accurate throughout a wide range of frequencies of tape tension variation, without resonances. The tape tension transducers, by virtue of the mechanical aspects, have upper limits to the effective range of tension measurement, for example, defined by resonance of the mechanism. U.S. Pat. No. 4,400,745 estimates tension by summing the currents from both the supply reel and the take-up reel motors, divides the result by two, and equates the same to tape tension. In U.S. Pat. No. 3,913,866, a signal proportional to the angular velocity of the supply and take-up reels is generated at each reel and supplied to a torque device at the other reel. Japan JP6-349153 compares a frequency of a motor or reel to an expected frequency to correct the torque of a motor to obtain stable tape tension without providing a tension lever or arm. Such rough estimates of the tape tension are not sufficiently accurate for modern high speed tape motion.

A precise control of tape tension is illustrated by U.S. Pat. No. 4,015,799 which determines tape tension based on the differences in torque as applied to the supply and take-up reels. Lineal tape position and angular reel displacement for both reels are monitored to determine reel radii, tape inertia and velocity or position error. A motor current algorithm is utilized to generate the appropriate torque for each reel to drive the error to zero along a predetermined profile with negligible tape tension disturbances. U.S. Pat. No. 5,860,610 discusses defining the reel inertia similar to that of the '799 patent, employing a conversion table, to control the torque of a motor, and a second embodiment in which the output of a pressure sensitive tension sensor is differentiated and combined with the output of a torque modulator. In a third embodiment, change in rotating speed of a supply reel is employed with the torque modulator in an attempt to suppress the change in speed.

Modern tapes are driven at high speeds and are more sensitive to changes in tape tension, for example, in that the speed variation at the tape head will result in data read or write errors, or smudging at a print roll. In the case of magnetic tape, modern tapes are thinner to allow more tape to be spooled on a reel at the same diameter, and thereby to allow a greater data storage capacity. Hence, such tapes are more sensitive to changes in tape tension, and may be subjected to damage, such as tape stretch.

SUMMARY OF THE INVENTION

In accordance with the present invention, tension control systems, methods, and tape transports provide dynamic tension control for tape transported along a tape path between a supply reel and a take-up reel, the supply reel driven by a supply reel motor, and the take-up reel driven by a take-up reel motor.

In one embodiment, a supply tachometer measures the rotational angular displacement of the supply reel, and a take-up tachometer measures the rotational angular displacement of the take-up reel. A tension control system controller:

measures the rotational angular displacement of the supply reel from the supply tachometer;

measures the rotational angular displacement of the take-up reel from the take-up tachometer;

determines from the measured rotational angular displacement of the supply reel, the rotational angular velocity of the supply reel;

determines from the determined rotational angular velocity of the supply reel, a linear speed for the tape at the supply reel;

determines from the measured rotational angular displacement of the take-up reel, the rotational angular velocity of the take-up reel;

determines from the determined rotational angular velocity of the take-up reel, a linear speed for the tape at the take-up reel;

compares the determined linear speed for the tape at the supply reel to the determined linear speed for the tape at the take-up reel, to determine a delta velocity between the linear speeds; and operates at least one of the supply reel motor and the take-up reel motor in accordance with a function of the delta velocity to provide a torque to at least one of the supply reel and the take-up reel tending to reduce the delta velocity.

In a further embodiment, the controller operates the reel(s) in accordance with a function of the delta velocity, of the current inertial characteristics of the reel(s), and of the current radius of tape of the reel(s).

In a still further embodiment, the controller determines the linear speed for the tape at each of the supply reel and the take-up reel by determining the linear speed from the rotational angular velocity of the reel as a function of the current radius of tape of the reel.

In another embodiment, the controller operates the supply reel motor and the take-up reel motor in accordance with a function of the delta velocity to provide equal and opposite torques to the supply reel and the take-up reel tending to reduce the delta velocity.

In still another embodiment, a tape tension transducer is mounted in the tape path for measuring the tension for the tape in the tape path; and a controller:

measures the tension for the tape in the tape path from the tape tension transducer;

determines whether the measured tension is within a predetermined range of a nominal tension;

and, if the measured tension is within the predetermined range of the nominal tension, measures the rotational angular displacement of the supply reel from the supply tachometer;

measures the rotational angular displacement of the take-up reel from the take-up tachometer;

determines from the measured rotational angular displacement of the supply reel, the rotational angular velocity of the supply reel;

determines from the determined rotational angular velocity of the supply reel, a linear speed for the tape at the supply reel;

determines from the measured rotational angular displacement of the take-up reel, the rotational angular velocity of the take-up reel;

determines from the determined rotational angular velocity of the take-up reel, a linear speed for the tape at the take-up reel;

compares the determined linear speed for the tape at the supply reel to the determined linear speed for the tape at the take-up reel, to determine a delta velocity between the linear speeds; and operates at least one of the supply reel motor and the take-up reel motor in accordance with a function of the delta velocity to provide a torque to at least one of the supply reel and the take-up reel tending to reduce the delta velocity.

In an additional embodiment, a controller:

A) establishes a nominal tension on the tape:
1) measures the rotational angular displacement of the supply reel from the supply tachometer;
2) derives reel radii and tape inertial values corresponding thereto;
3) measures the rotational angular displacement of the take-up reel from the take-up tachometer;
4) derives reel radii and tape inertial values corresponding thereto; and
5) operates the supply reel motor and the take-up reel motor to apply a nominal tension to the tape; and B) maintains tension control tending to maintain the tape tension constant:
1) determines from the measured rotational angular displacement of the supply reel, the rotational angular velocity of the supply reel;
2) determines from the determined rotational angular velocity and derived reel radii values of the supply reel, a linear speed for the tape at the supply reel;
3) determines from the measured rotational angular displacement of the take-up reel, the rotational angular velocity of the take-up reel;
4) determines from the determined rotational angular velocity and derived reel radii values of the take-up reel, a linear speed for the tape at the take-up reel;
5) compares the determined linear speed for the tape at the supply reel to the determined linear speed for the tape at the take-up reel, to determine a delta velocity between the linear speeds; and
6) operates at least one of the supply reel motor and the take-up reel motor in accordance with a function of the determined delta velocity and derived inertial values to provide a torque to at least one of the supply reel and the take-up reel tending to reduce the delta velocity.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
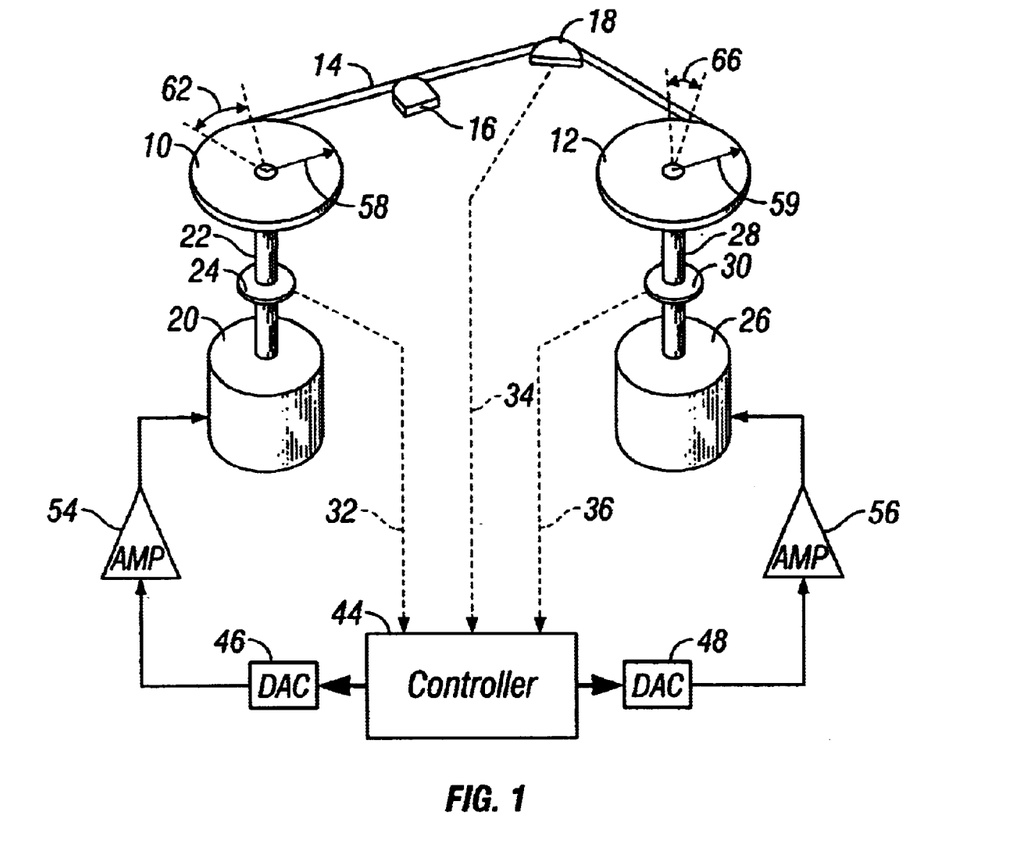
FIG. 1 is a block diagrammatic representation of a tape transport and tension control system in accordance with an embodiment of the present invention.

Referring to FIG. 1, a tape transport and tension control system is illustrated for transporting a tape 14, such as a magnetic tape, along a tape path between a supply reel 10 and a take-up reel 12. As an example, a read/write head 16 is located in the tape path, such that the tape is transported between the supply reel 10 and the take-up reel 12 past the read/write head 16. In one embodiment, a tape tension transducer 18 is mounted in the tape path for measuring the tension for the tape in the tape path.

The supply reel 10 is driven by a supply reel motor 20, for example, via a shaft 22. A supply tachometer 24 is arranged to measure the rotational angular displacement of the supply reel 20. Similarly, the take-up reel 12 is driven by a take-up reel motor 26, for example by means of a shaft 28. A take-up tachometer 30 is arranged to measure the rotational angular displacement of the take-up reel.

As discussed above, the terms "supply" and "take-up" reels refer to the two reels of a two reel system, and typically are used to describe respectively the supply reel from which the tape originates and the take-up reel to which the tape is directed, but the tape may be wound and unwound with respect to either reel in a bi-directional fashion.

The tachometers 24, 30 may be mounted at the respective shafts, at the respective motors, or at the respective reels, and may comprise optical or magnetic line tachometers, such as are known to those of skill in the art. In one example, digital optical line tachometers comprise 1024 marks for a full revolution of the associated reel or motor.

One embodiment of a tape transport is described in coassigned U.S. Pat. No. 4,015,799, and may implement the present invention. An incremental encoder tape tachometer is discussed in the '799 patent, but is not necessary to the present invention and is not shown herein. Rather, as an option, the tape tension transducer 18 is shown for measuring the tension for the tape in the tape path. The incremental encoder tape tachometer illustrated in the '799 patent is useful for determining the actual travel of the tape, from which the radii of the reels may be determined. In the illustrated embodiment of FIG. 1, the beginning radius of the take-up reel 12 is known as the tape is initially wound onto the reel, and the angular displacement of the take-up tachometer 30 as the tape 14 is initially wound on the take-up reel may be employed together with the angular displacement of the supply tachometer 24 to determine the radius of the supply reel 10.

The optional tape tension transducer 18 may comprise any suitable type of tension transducer known to those of skill in the art, examples of which comprise direct sensing pressure transducers, load cells, or tension arms. Pressure responsive air jet or air bearing transducers may also be employed, but are often expensive without an accompanying air bearing system for the tape transport. The tape tension transducer 18 provides a signal, such as an analog signal, representing the tension for the tape 14 in the tape path, and the analog signal is typically converted to digital by an A/D converter.

An output 32 of the supply tachometer 24, an output 34 of the optional tape tension transducer 18, and an output 36 of the take-up tachometer 30 are supplied to a controller 44. The controller 44 may comprise a special motion control logic such as is discussed in the '799 patent, or may comprise a microprocessor controller such as is known to those of skill in the art.

The controller 44 employs the outputs 32, 36 of the supply and take-up tachometers to maintain tension control tending to maintain the tension of tape 14 constant by operating at least one of the supply reel motor 20 and the take-up reel motor 26 in accordance with a function of a determined delta velocity, as will be discussed, to provide a torque to at least one of the supply reel and the take-up reel tending to reduce the delta velocity. The outputs of the controller 44, in one example, are in digital form and drive digital-to-analog converters 46, 48. The outputs of the digital-to-analog converters 46 and 48 are fed to current mode power amplifiers 54 and 56, which supply motor current to the supply reel motor 20 and the take-up reel motor 26.

The present invention relates to delta velocity to control variations in tension about a nominal "DC", or static, tension value, and has no "DC" term itself. Hence, the nominal static tension value may be set to a value and measured or derived from any of known techniques, such as direct tension measurement employing the optional tape tension transducer 18, or by calculation, such as is discussed in the '799 patent.

As an example, the torque equations for each motor 20 and 26, which may be used to set the static tension level for the tape with no feedback, such as discussed in the '799 patent, are:

$$J1*alpha1 = I1Kt1 + Ft*R1 + Ff1*R1 \text{ and}$$

$$J2*alpha2 = I2Kt2 + Ft*R2 + Ff2*R2.$$

Solving for the plant inputs, I1 and I2, $$I1 = (J1*alpha1 + Ft*R1 + Ff1*R1)/Kt1 \text{ and}$$

$$I2 = (J2*alpha2 + Ft*R2 + Ff2*R2)/Kt2,$$

Where,

I1=motor current 1

Kt1=motor torque constant 1

J1=motor inertia 1 alpha1=the angular acceleration of motor 1

R1=radius of reel 1

Ff1=friction force (at the tape) applied to motor 1

And the corresponding parameters with "2" apply to motor 2.

The friction force for the two reels is the sum of the tape path friction force and the motor rotation friction torque for each motor multiplied by the radius of each motor. The friction force in general is not a linear function of the plant states, and is modeled by nonlinear equations.

The two motor currents, I1 and I2, are provided by the control system law by solving the above equations to provide the desired tape tension, tape velocity, and to overcome friction. When an error exists, the controller 44 operates the motors 20, 26 to control the reels to reduce it with reel angular accelerations that produce the same linear tape acceleration at the two reels. Each motor current is made up of an acceleration current, a tension current, and a friction current. Rewriting the equations in this way:

$$I1 = Iacceleration1 + Itension1 + Ifriction1 \text{ and}$$

$$I2 = Iacceleration2 + Itension2 + Ifriction2,$$

Where $$Iaccleration1 = (J1*alpha1)/Kt1,$$

$$Itension1 = Ft*R1/Kt1,$$

$$Ifriction1 = Ff1*R1/Kt1.$$

And the corresponding parameters with "2" apply to motor 2.

Thus, the static tension level for each reel is shown as:

$$Itension1 = Ft*R1/Kt1 \text{ and}$$

$$Itension2 = Ft*R2/Kt2.$$

The method for providing direct tension force sensing is a modification of the above equations. A tension sensing device, such as tape tension transducer 18, is provided to sense the actual tension level for the tape. The transducer produces a signal representing tape tension, that is converted to a digital number for use in the controller 44. The sensed tension signal is subtracted from a reference tension value to produce a tension error value. This tension error is added to the static tension number in the above equations. The resulting control equations for tension then become:

$$Itension1 = [Ft + (Fref - Fsense)*Gtension]*R1/Kt1, \text{ and}$$

$$Itension2 = [Ft + (Fref - Fsense)*Gtension]*R2/Kt2.$$

Where

Fref=reference tension signal,

Fsense=sensed tension signal, and

Gtension=tension feedback compensator transfer function.

When the actual steady-state tension in the tape is equal to the reference or desired tension level, the steady-state value of the term (Fref−Fsense) equals zero, and the feedback signal doesn't modify the static tension setting. If plant parameters, such as motor torque constant, and amplifier gain, are not nominal, the direct tension force sensing will provide correction value to the static tension, Ft, to correct for such deviations.

In addition, the transfer function of the tension feedback compensator can correct for low-frequency disturbances due to tape start and stop cycles, but the bandwidth of this system is limited by the bandwidth of the tension sensing transducer.

Figure 2:
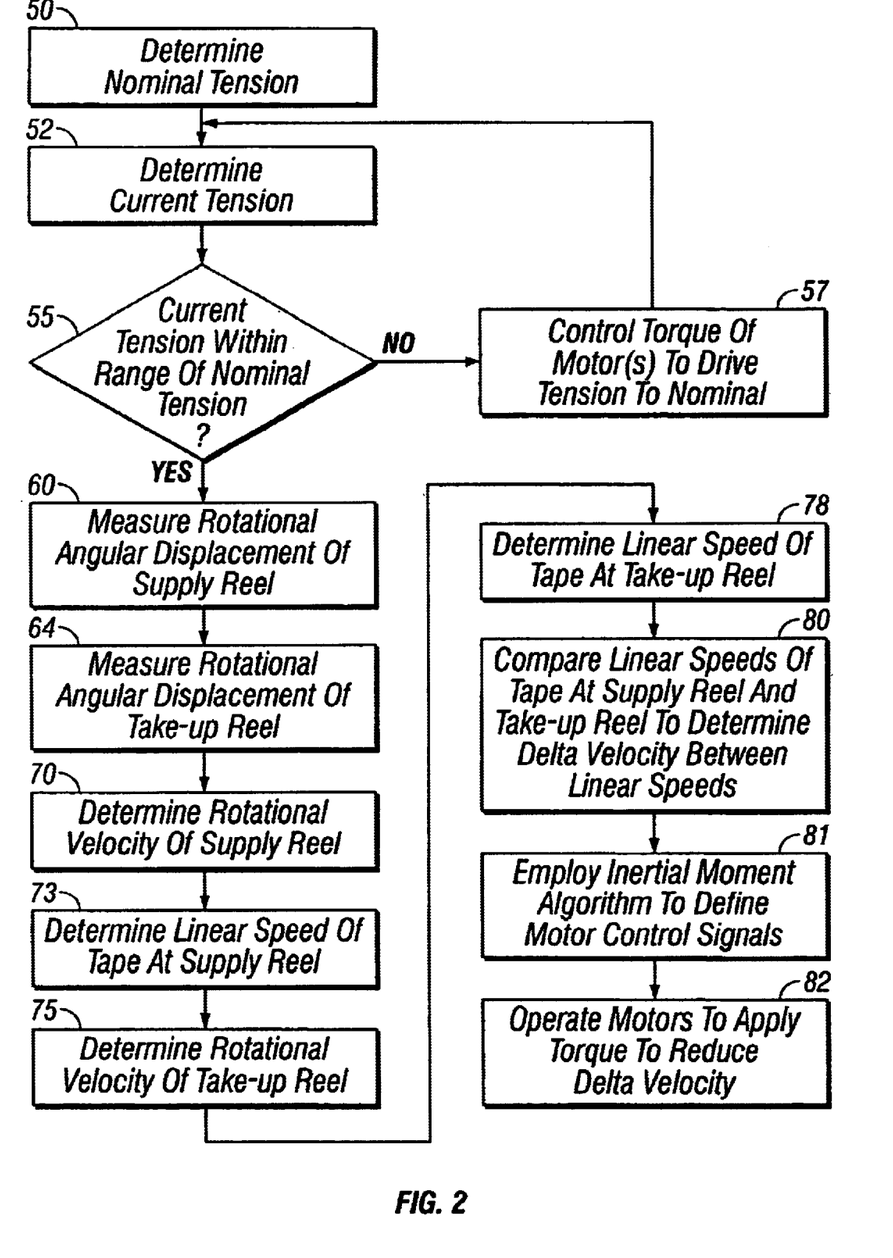
FIG. 2 is a flow chart depicting an embodiment of the method of the present invention for operating the tape transport and tension control system of FIG. 1.

FIG. 2 depicts an embodiment of the method of the present invention for operating a tape transport and tension control system to provide dynamic tension control for tape, e.g., for controller 44 of FIG. 1 to provide dynamic tension control for tape 14 as it is transported along a tape path between supply reel 10 and take-up reel 12.

Referring to FIG. 2, in step 50, the controller 44 of FIG. 1 determines the nominal tension for the tape. In step 52, the current tape tension is determined. As discussed above, the current static tape tension may be determined by calculation, or may be directly measured, called actual tape tension, by tape tension transducer 18. In step 55, the nominal tension and current tension are compared to determine the error in static tension, and the error is compared to a predetermined range to make the determination whether the current tension is within the range of the nominal tension, or is outside the predetermined range. The predetermined range is an optional determination, but is advantageous in that, if the current tension is too far from nominal, it is likely that something else is involved that must first be corrected, and it makes little sense to attempt to provide dynamic tension control until the correction is made. The term "range" is defined herein to comprise a proportion, an absolute value, or a signed value. Hence, in step 57, that correction is made, or initiated, and the process cycles back to step 52 to again determine the current tension and again compare the current tension to the nominal tension in step 55.

Thus, the controller 44 of FIG. 1, performs the functions of 1) measuring the rotational angular displacement of the supply reel 10, from the supply tachometer 24; 2) deriving reel radii 58 and tape inertial values corresponding thereto; 3) measuring the rotational angular displacement of the take-up reel 12, from the take-up tachometer 30; 4) deriving reel radii 59 and tape inertial values corresponding thereto; and 5) operating the supply reel motor 20 and the take-up reel motor 26 to apply a nominal tension to the tape 14. Those of skill in the art understand that the reel radii 58, 59 and the tape inertial values constantly change as tape is wound onto one reel and unwound from the other reel. This information, once determined, may be used to reference tables in a lookup fashion, or may be implemented in a calculation, based on the accumulated rotational position of the associated reel 10, 12.

Still referring to FIG. 2, if the nominal tension is within the predetermined range as determined by step 55, the controller 44 of FIG. 1, in step 60, measures the rotational angular displacement 62 of the supply reel 10 of FIG. 1, from the supply tachometer 24. In step 64 of FIG. 2, the controller 44 of FIG. 1 measures the rotational angular displacement 66 of the take-up reel 12, from the take-up tachometer 26.

In step 70 of FIG. 2, the controller 44 of FIG. 1 determines, from the measured rotational angular displacement 62 of the supply reel 10, the rotational angular velocity of the supply reel; and, in step 73 of FIG. 2, determines, from the determined rotational angular velocity of the supply reel and the reel radii 58 of FIG. 1, discussed above, a linear speed for the tape 14 at the supply reel 10, e.g., by multiplying the supply reel rotational angular velocity by the supply reel radius.

In step 75 of FIG. 2, the controller 44 of FIG. 1 determines, from the measured rotational angular displacement 66 of the take-up reel 12, the rotational angular velocity of the take-up reel; and, in step 78 of FIG. 2, determines, from the determined rotational angular velocity of the take-up reel and the reel radii 59 of FIG. 1, discussed above, a linear speed for the tape 14 at the take-up reel 12, e.g., by multiplying the take-up reel rotational angular velocity by the take-up reel radius.

In step 80 of FIG. 2, the controller 44 of FIG. 1 compares the determined linear speed for the tape at the supply reel 10 to the determined linear speed for the tape at the take-up reel 12, to determine a delta velocity between the linear speeds.

As will .be,discussed, the delta velocity is related to any dynamic tension error for the tape.

In steps 81 and 82 of FIG. 2, the controller 44 of FIG. 1 employs the tape inertial values for the reels, discussed above, and operates at least one of the supply reel motor 20 and the take-up reel motor 26 in accordance with a function of the delta velocity to provide a torque to at least one of the supply reel 10 and the take-up reel 12 tending to reduce the delta velocity.

Preferably, but not necessarily, in step 82 of FIG. 2, the controller 44 of FIG. 1 operates the supply reel motor 20 and the take-up reel motor 26 in accordance with a function of the delta velocity to provide equal and opposite torques to the supply reel 10 and the take-up reel 12 tending to reduce the delta velocity.

Still referring to FIG. 2, upon completion of step 82, or during step 82, the process cycles back to either step 52 or to step 60 to provide the delta velocity correction dynamically with respect to the next linear elements of tape 14.

Thus, the delta velocity control provides information about the rate of change of tension, and is used to sense tension changes, and feed them back to the motors 20, 26 before actual tension changes develop. Since the velocity of each reel is sensed and computed, these signals can be used to compute the rate of change of tension with no bandwidth constraints, other than the sampling rate for these measurements.

The equation for the tension force in the tape is given below:

$$Ft=(theta1*R1-theta2*R2)*Ks+(omega1*R1-omega2*R2)Kd.$$

where
theta1=angular position of reel 1
theta2=angular position of reel 2
omega1=angular speed of reel 1
omega2=angular speed of reel 2
Ks=spring constant of the tape, and
Kd=damping constant of the tape.

When a tension transient occurs, the tape path of the plant will respond with a damped sinusoidal variation in tension. This is a classical response for this type of second-order system. The damping in the plant, without tension feedback, is determined by the tape damping constant, Kd. This term is typically quite small, resulting in a sinusoidal oscillation in tension that continues for a long time. If successive transients occur, they can add to the amplitude of the damped sinusoid, resulting in increased levels of tension variations.

The method of differential or delta velocity control of tension transients provides a direct method to increase the damping of the tape path. Note that the velocity of the tape at each reel is given by the equations:

$$Vt1 = omega1 * R1$$

$$Vt2 = omega1 * R2.$$

The values of Vt1 and Vt2 are measured in the system with sensors, such as digital encoders 24, 30 of FIG. 1, mounted to the reel motors, which provide a measurement relating to omega1 nd omega2. Since the radius of each tape reel is known in the control system, Vt1 and Vt2 are computed by the above equations. The delta velocity is computed by the following equation.

$$Vdelta = Vt1 - Vt2.$$

This equation can be rewritten as follows.

$$Vdelta = (omega1 * R - omega2 * R2).$$

Note that the value computed for Vdelta by the control system is exactly the value in the tape path that provides damping to the tension transients by the tape damping constant, Kd. Additional damping is therefore provided in the control system by including the term, Vdelta, in the feedback to the two motor currents. In this manner, damping torques will be developed in each motor to provide damping to the tension transients, which are being sensed as a delta velocity between the two tape velocities at the reels.

To include this delta velocity feedback in the tension motor current calculation law, the equations for tension current are modified as follows.

$$Itension1 = [Ft + (Vdelta * Gdelta) + (Fref - Fsense) * Gtension] * R1/Kt1,$$

and $$Itension2 = [Ft + (Vdelta * Gdelta) + (Fref - Fsense) * Gtension] * R2/Kt2.$$

Figure 3:
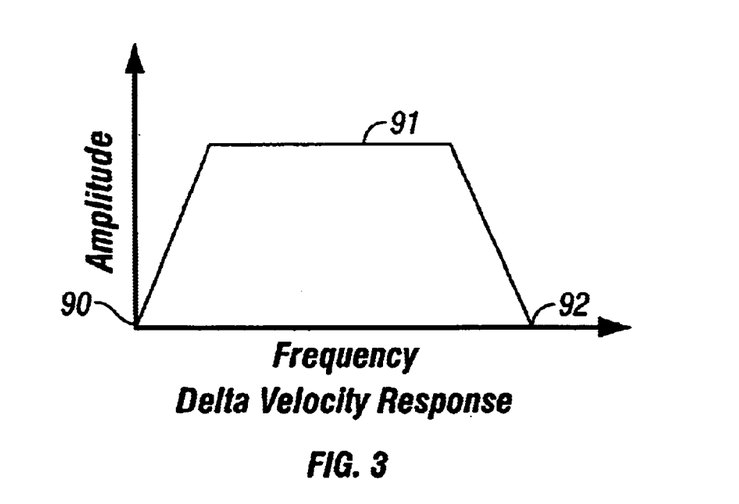
FIG. 3 is a representation of the response of delta velocity tension control at various frequencies.

This last set of equations provides additional tension damping forces in the system to counteract the tension transients. Referring additionally to FIG. 3, the compensation term Gdelta is provided by the controller 44 of FIG. 1, and is arranged to provide zero gain at DC 90 and useful gain 91 with stability enhancement at higher frequencies up to a limit 92 set by the velocity sampling rate. The result is a dynamic control of tape tension.

While the preferred embodiments of the present invention have been illustrated in detail, it should be apparent that modifications and adaptations to those embodiments may occur to one skilled in the art without departing from the scope of the present invention as set forth in the following claims.

We claim:

1. A tension control system for providing dynamic tension control for tape transported along a tape path between a supply reel and a take-up reel, said supply reel driven by a supply reel motor, said take-up reel driven by a take-up reel motor, comprising:

a supply tachometer for measuring the rotational angular displacement of said supply reel;

a take-up tachometer for measuring the rotational angular displacement of said take-up reel; and a controller for operating said supply reel motor and said take-up reel motor, said controller:

measures said rotational angular displacement of said supply reel from said supply tachometer;

measures said rotational angular displacement of said take-up reel from said take-up tachometer;

determines from said measured rotational angular displacement of said supply reel, the rotational angular velocity of said supply reel;

determines from said determined rotational angular velocity of said supply reel, a linear speed for said tape at said supply reel;

determines from said measured rotational angular displacement of said take-up reel, the rotational angular velocity of said take-up reel;

determines from said determined rotational angular velocity of said take-up reel, a linear speed for said tape at said take-up reel;

compares said determined linear speed for said tape at said supply reel to said determined linear speed for said tape at said take-up reel, to determine a delta velocity between said linear speeds; and operates at least one of said supply reel motor and said take-up reel motor in accordance with a function of said delta velocity to provide a torque to at least one of said supply reel and said take-up reel tending to reduce said delta velocity.

2. The tension control system of claim 1, wherein said controller operates said at least one reel in accordance with a function of said delta velocity, of the current inertial characteristics of said at least one reel, and of the current radius of tape of said at least one reel.

3. The tension control system of claim 2, wherein said controller determines said linear speed for said tape at each of said supply reel and said take-up reel by determining said linear speed from said rotational angular velocity of each said reel as a function of the current radius of tape of each said reel.

4. The tension control system of claim 1, wherein said controller operates said supply reel motor and said take-up reel motor in accordance with a function of said delta velocity to provide equal and opposite torques to said supply reel and said take-up reel tending to reduce said delta velocity.

5. A tension control system for providing dynamic tension control for tape transported along a tape path between a supply reel and a take-up reel, said supply reel driven by a supply reel motor, said take-up reel driven by a take-up reel motor, comprising:

a supply tachometer for measuring the rotational angular displacement of said supply reel;

a take-up tachometer for measuring the rotational angular displacement of said take-up reel;

a tape tension transducer mounted in said tape path for measuring the tension for said tape in said tape path; and a controller for operating said supply reel motor and said take-up reel motor, said controller:

measures said tension for said tape in said tape path from said tape tension transducer;

determines whether said measured tension is within a predetermined range of a nominal tension;

and, if said measured tension is within said predetermined range of said nominal tension, measures said rotational angular displacement of said supply reel from said supply tachometer;

measures said rotational angular displacement of said take-up reel from said take-up tachometer;

determines from said measured rotational angular displacement of said supply reel, the rotational angular velocity of said supply reel;

determines from said determined rotational angular velocity of said supply reel, a linear speed for said tape at said supply reel;

determines from said measured rotational angular displacement of said take-up reel, the rotational angular velocity of said take-up reel;

determines from said determined rotational angular velocity of said take-up reel, a linear speed for said tape at said take-up reel;

compares said determined linear speed for said tape at said supply reel to said determined linear speed for said tape at said take-up reel, to determine a delta velocity between said linear speeds; and operates at least one of said supply reel motor and said take-up reel motor in accordance with a function of said delta velocity to provide a torque to at least one of said supply reel and said take-up reel tending to reduce said delta velocity.

6. A tension control system for providing dynamic tension control for tape transported along a tape path between a supply reel and a take-up reel, said supply reel driven by a supply reel motor, said take-up reel driven by a take-up reel motor, comprising:

a supply tachometer for measuring the rotational angular displacement of said supply reel;

a take-up tachometer for measuring the rotational angular displacement of said take-up reel; and a controller for operating said supply reel motor and said take-up reel motor, said controller:

A) establishes a nominal tension on said tape:
1) measures said rotational angular displacement of said supply reel from said supply tachometer;
2) derives reel radii and tape inertial values corresponding thereto;
3) measures said rotational angular displacement of said take-up reel from said take-up tachometer;
4) derives reel radii and tape inertial values corresponding thereto; and
5) operates said supply reel motor and said take-up reel motor to apply a nominal tension to said tape; and B) maintains tension control tending to maintain said tape tension constant:
1) determines from said measured rotational angular displacement of said supply reel, the rotational angular velocity of said supply reel;
2) determines from said determined rotational angular velocity and said derived reel radii values of said supply reel, a linear speed for said tape at said supply reel;
3) determines from said measured rotational angular displacement of said take-up reel, the rotational angular velocity of said take-up reel;
4) determines from said determined rotational angular velocity and said derived reel radii values of said take-up reel, a linear speed for said tape at said take-up reel;
5) compares said determined linear speed for said tape at said supply reel to said determined linear speed for said tape at said take-up reel, to determine a delta velocity between said linear speeds; and
6) operates at least one of said supply reel motor and said take-up reel motor in accordance with a function of said delta velocity and said derived inertial values to provide a torque to at least one of said supply reel and said take-up reel tending to reduce said delta velocity.

7. Apparatus for transporting a length of tape between a supply reel and a take-up reel, comprising:

a supply reel motor for rotating said supply reel;

a take-up reel motor for rotating said take-up reel;

a supply tachometer for measuring the rotational angular displacement of said supply reel;

a take-up tachometer for measuring the rotational angular displacement of said take-up reel; and a controller for operating said supply reel motor and said take-up reel motor, said controller:

measures said rotational angular displacement of said supply reel from said supply tachometer;

measures said rotational angular displacement of said take-up reel from said take-up tachometer;

determines from said measured rotational angular displacement of said supply reel, the rotational angular velocity of said supply reel;

determines from said determined rotational angular velocity of said supply reel, a linear speed for said tape at said supply reel;

determines from said measured rotational angular displacement of said take-up reel, the rotational angular velocity of said take-up reel;

determines from said determined rotational angular velocity of said take-up reel, a linear speed for said tape at said take-up reel;

compares said determined linear speed for said tape at said supply reel to said determined linear speed for said tape at said take-up reel, to determine a delta velocity between said linear speeds; and operates at least one of said supply reel motor and said take-up reel motor in accordance with a function of said delta velocity to provide a torque to at least one of said supply reel and said take-up reel tending to reduce said delta velocity.

8. The apparatus of claim 7, wherein said controller operates said at least one reel in accordance with a function of said delta velocity, of the current inertial characteristics of said at least one reel, and of the current radius of tape of said at least one reel.

9. The apparatus of claim 8, wherein said controller determines said linear speed for said tape at each of said supply reel and said take-up reel by determining said linear speed from said rotational angular velocity of each said reel as a function of the current radius of tape of each said reel.

10. The apparatus of claim 7, wherein said controller operates said supply reel motor and said take-up reel motor in accordance with a function of said delta velocity to provide equal and opposite torques to said supply reel and said take-up reel tending to reduce said delta velocity.

11. Apparatus for transporting a length of tape between a supply reel and a take-up reel, comprising:

a supply reel motor for rotating said supply reel;

a take-up reel motor for rotating said take-up reel;

a supply tachometer for measuring the rotational angular displacement of said supply reel;

a take-up tachometer for measuring the rotational angular displacement of said take-up reel;

a tape tension transducer mounted in said tape path for measuring the tension for said tape in said tape path; and a controller for operating said supply reel motor and said take-up reel motor, said controller:

measures said tension for said tape in said tape path from said tape tension transducer;

determines whether said measured tension is within a predetermined range of a nominal tension; and,
if said measured tension is within said predetermined range of said nominal tension;
measures said rotational angular displacement of said supply reel from said supply tachometer;
measures said rotational angular displacement of said take-up reel from said take-up tachometer;
determines from said measured rotational angular displacement of said supply reel, the rotational angular velocity of said supply reel;
determines from said determined rotational angular velocity of said supply reel, a linear speed for said tape at said supply reel;
determines from said measured rotational angular displacement of said take-up reel, the rotational angular velocity of said take-up reel;
determines from said determined rotational angular velocity of said take-up reel, a linear speed for said tape at said take-up reel;
compares said determined linear speed for said tape at said supply reel to said determined linear speed for said tape at said take-up reel, to determine a delta velocity between said linear speeds; and
operates at least one of said supply reel motor and said take-up reel motor in accordance with a function of said delta velocity to provide a torque to at least one of said supply reel and said take-up reel tending to reduce said delta velocity.

12. Apparatus for transporting a length of tape between a supply reel and a take-up reel, comprising:
a supply reel motor for rotating said supply reel;
a take-up reel motor for rotating said take-up reel;
a supply tachometer for measuring the rotational angular displacement of said supply reel;
a take-up tachometer for measuring the rotational angular displacement of said take-up reel; and
a controller for operating said supply reel motor and said take-up reel motor, said controller:
  A) establishes a nominal tension on said tape:
    1) measures said rotational angular displacement of said supply reel from said supply tachometer;
    2) derives reel radii and tape inertial values corresponding thereto;
    3) measures said rotational angular displacement of said take-up reel from said take-up tachometer;
    4) derives reel radii and tape inertial values corresponding thereto; and
    5) operates said supply reel motor and said take-up reel motor to apply a nominal tension to said tape; and
  B) maintains tension control tending to maintain said tape tension constant:
    1) determines from said measured rotational angular displacement of said supply reel, the rotational angular velocity of said supply reel;
    2) determines from said determined rotational angular velocity and said derived reel radii values of said supply reel, a linear speed for said tape at said supply reel;
    3) determines from said measured rotational angular displacement of said take-up reel, the rotational angular velocity of said take-up reel;
    4) determines from said determined rotational angular velocity and said derived reel radii values of said take-up reel, a linear speed for said tape at said take-up reel;
    5) compares said determined linear speed for said tape at said supply reel to said determined linear speed for said tape at said take-up reel, to determine a delta velocity between said linear speeds; and
    6) operates at least one of said supply reel motor and said take-up reel motor in accordance with a function of said delta velocity and said derived inertial values to provide a torque to at least one of said supply reel and said take-up reel tending to reduce said delta velocity.

13. A magnetic tape drive for transporting a magnetic tape along a tape path between a supply reel and a take-up reel, comprising:
a read/write head located in said tape path, such that said magnetic tape is transported between said supply reel and said take-up reel past said read/write head;
a supply reel motor for rotating said supply reel;
a take-up reel motor for rotating said take-up reel;
a supply tachometer for measuring the rotational angular displacement of said supply reel;
a take-up tachometer for measuring the rotational angular displacement of said take-up reel; and
a controller for operating said supply reel motor and said take-up reel motor, said controller:
  measures said rotational angular displacement of said supply reel from said supply tachometer;
  measures said rotational angular displacement of said take-up reel from said take-up tachometer;
  determines from said measured rotational angular displacement of said supply reel, the rotational angular velocity of said supply reel;
  determines from said determined rotational angular velocity of said supply reel, a linear speed for said magnetic tape at said supply reel;
  determines from said measured rotational angular displacement of said take-up reel, the rotational angular velocity of said take-up reel;
  determines from said determined rotational angular velocity of said take-up reel, a linear speed for said magnetic tape at said take-up reel;
  compares said determined linear speed of said magnetic tape at said supply reel to said determined linear speed for said magnetic tape at said take-up reel, to determine a delta velocity between said linear speeds; and
  operates at least one of said supply reel motor and said take-up reel motor in accordance with a function of said delta velocity to provide a torque to at least one of said supply reel and said take-up reel tending to reduce said delta velocity.

14. The magnetic tape drive of claim 13, wherein said controller operates said at least one reel in accordance with a function of said delta velocity, of the current inertial characteristics of said at least one reel, and of the current radius of magnetic tape of said at least one reel.

15. The magnetic tape drive of claim 14, wherein said controller determines said linear speed for said magnetic tape at each of said supply reel and said take-up reel by determining said linear speed from said rotational angular velocity of each said reel as a function of the current radius of magnetic tape of each said reel.

16. The magnetic tape drive of claim 13, wherein said controller operates said supply reel motor and said take-up reel motor in accordance with a function of said delta velocity to provide equal and opposite torques to said supply reel and said take-up reel tending to reduce said delta velocity.

17. A magnetic tape drive for transporting a magnetic tape along a tape path between a supply reel and a take-up reel, comprising:
- a read/write head located in said tape path, such that said magnetic tape is transported between said supply reel and said take-up reel past said read/write head;
- a supply reel motor for rotating said supply reel;
- a take-up reel motor for rotating said take-up reel;
- a supply tachometer for measuring the rotational angular displacement of said supply reel;
- a take-up tachometer for measuring the rotational angular displacement of said take-up reel;
- a tape tension transducer mounted in said tape path for measuring the tension of said magnetic tape in said tape path; and
- a controller for operating said supply reel motor and said take-up reel motor, said controller:
  - measures said tension of said magnetic tape in said tape path from said tape tension transducer;
  - determines whether said measured tension is within a predetermined range of a nominal tension; and,
  - if said measured tension is within said predetermined range of said nominal tension;
  - measures said rotational angular displacement of said supply reel from said supply tachometer;
  - measures said rotational angular displacement of said take-up reel from said take-up tachometer;
  - determines from said measured rotational angular displacement of said supply reel, the rotational angular velocity of said supply reel;
  - determines from said determined rotational angular velocity of said supply reel, a linear speed for said magnetic tape at said supply reel;
  - determines from said measured rotational angular displacement of said take-up reel, the rotational angular velocity of said take-up reel;
  - determines from said determined rotational angular velocity of said take-up reel, a linear speed for said magnetic tape at said take-up reel;
  - compares said determined linear speed of said magnetic tape at said supply reel to said determined linear speed for said magnetic tape at said take-up reel, to determine a delta velocity between said linear speeds; and
  - operates at least one of said supply reel motor and said take-up reel motor in accordance with a function of said delta velocity to provide a torque to at least one of said supply reel and said take-up reel tending to reduce said delta velocity.

18. A magnetic tape drive for transporting a magnetic tape along a tape path between a supply reel and a take-up reel, comprising:
- a read/write head located in said tape path, such that said magnetic tape is transported between said supply reel and said take-up reel past said read/write head;
- a supply reel motor for rotating said supply reel;
- a take-up reel motor for rotating said take-up reel;
- a supply tachometer for measuring the rotational angular displacement of said supply reel;
- a take-up tachometer for measuring the rotational angular displacement of said take-up reel; and
- a controller for operating said supply reel motor and said take-up reel motor, said controller:
  - A) establishes a nominal tension on said tape:
    1) measures said rotational angular displacement of said supply reel from said supply tachometer;
    2) derives reel radii and tape inertial values corresponding thereto;
    3) measures said rotational angular displacement of said take-up reel from said take-up tachometer;
    4) derives reel radii and tape inertial values corresponding thereto; and
    5) operates said supply reel motor and said take-up reel motor to apply a nominal tension to said tape; and
  - B) maintains tension control tending to maintain said tape tension constant:
    1) determines from said measured rotational angular displacement of said supply reel, the rotational angular velocity of said supply reel;
    2) determines from said determined rotational angular velocity and said derived reel radii values of said supply reel, a linear speed for said tape at said supply reel;
    3) determines from said measured rotational angular displacement of said take-up reel, the rotational angular velocity of said take-up reel;
    4) determines from said determined rotational angular velocity and said derived reel radii values of said take-up reel, a linear speed for said tape at said take-up reel;
    5) compares said determined linear speed for said tape at said supply reel to said determined linear speed for said tape at said take-up reel, to determine a delta velocity between said linear speeds; and
    6) operates at least one of said supply reel motor and said take-up reel motor in accordance with a function of said delta velocity and said inertial values to provide a torque to at least one of said supply reel and said take-up reel tending to reduce said delta velocity.

19. A method for providing tension control for tape transported along a tape path between a supply reel and a take-up reel, said supply reel driven by a supply reel motor, said take-up reel driven by a take-up reel motor, said method comprising the steps of:
- determining the rotational angular velocity of said supply reel;
- determining from said determined rotational angular velocity of said supply reel, a linear speed for said tape at said supply reel;
- determining the rotational angular velocity of said take-up reel;
- determining from said determined rotational angular velocity of said take-up reel, a linear speed for said tape at said take-up reel;
- comparing said determined linear speed for said tape at said supply reel to said determined linear speed for said tape at said take-up reel, to determine a delta velocity between said linear speeds; and
- operating at least one of said supply reel motor and said take-up reel motor in accordance with a function of said delta velocity to provide a torque to at least one of said supply reel and said take-up reel tending to reduce said delta velocity.

20. The method of claim 19, wherein said operating step comprises operating said at least one reel in accordance with a function of said delta velocity, of the current inertial characteristics of said at least one reel, and of the current radius of tape of said at least one reel.

21. The method of claim 20, wherein said steps of determining a linear speed for said tape at said supply reel and at said take-up reel each comprises determining said linear speed from said rotational angular velocity of said reel as a function of the current radius of tape of said reel.

22. The method of claim 19, wherein said step of operating at least one of said supply reel motor and said take-up reel motor comprises operating said supply reel motor and said take-up reel motor in accordance with a function of said delta velocity to provide equal and opposite torques to said supply reel and said take-up reel tending to reduce said delta velocity.

23. A method for providing dynamic tension control for tape transported along a tape system tape path between a supply reel and a take-up reel, said supply reel driven by a supply reel motor, said take-up reel driven by a take-up reel motor, said tape system having a supply tachometer for measuring the rotational angular displacement of said supply reel, a take-up tachometer for measuring the rotational angular displacement of said take-up reel, and a tape tension transducer mounted in said tape path for measuring the tension of said magnetic tape in said tape path, said method comprising the steps of:

measuring said tension of said magnetic tape in said tape path from said tape tension transducer;
determining whether said measured tension is within a predetermined range of a nominal tension; and,
if said measured tension is within said predetermined range of said nominal tension;
measuring said rotational angular displacement of said supply reel from said supply tachometer;
measuring said rotational angular displacement of said take-up reel from said take-up tachometer;
determining from said measured rotational angular displacement of said supply reel, the rotational angular velocity of said supply reel;
determining from said determined rotational angular velocity of said supply reel, a linear speed for said magnetic tape at said supply reel;
determining from said measured rotational angular displacement of said take-up reel, the rotational angular velocity of said take-up reel;
determining from said determined rotational angular velocity of said take-up reel, a linear speed for said magnetic tape at said take-up reel;
comparing said determined linear speed of said magnetic tape at said supply reel to said determined linear speed for said magnetic tape at said take-up reel, to determine a delta velocity between said linear speeds; and
operating at least one of said supply reel motor and said take-up reel motor in accordance with a function of said delta velocity to provide a torque to at least one of said supply reel and said take-up reel tending to reduce said delta velocity.

24. A method for providing dynamic tension control for tape transported along a tape system tape path between a supply reel and a take-up reel, said supply reel driven by a supply reel motor, said take-up reel driven by a take-up reel motor, said tape system having a supply tachometer for measuring the rotational angular displacement of said supply reel, and a take-up tachometer for measuring the rotational angular displacement of said take-up reel, said method comprising the steps of:

measuring said rotational angular displacement of said supply reel from said supply tachometer;
measuring said rotational angular displacement of said take-up reel from said take-up tachometer;
determining from said measured rotational angular displacement of said supply reel, the rotational angular velocity of said supply reel;
determining from said determined rotational angular velocity of said supply reel, a linear speed for said tape at said supply reel;
determining from said measured rotational angular displacement of said take-up reel, the rotational angular velocity of said take-up reel;
determining from said determined rotational angular velocity of said take-up reel, a linear speed for said tape at said take-up reel;
comparing said determined linear speed for said tape at said supply reel to said determined linear speed for said tape at said take-up reel, to determine a delta velocity between said linear speeds; and
operating at least one of said supply reel motor and said take-up reel motor in accordance with a function of said delta velocity to provide a torque to at least one of said supply reel and said take-up reel tending to reduce said delta velocity.

25. A method for providing dynamic tension control for tape transported along a tape system tape path between a supply reel and a take-up reel, said supply reel driven by a supply reel motor, said take-up reel driven by a take-up reel motor, said tape system having a supply tachometer for measuring the rotational angular displacement of said supply reel, and a take-up tachometer for measuring the rotational angular displacement of said take-up reel, said method comprising the steps of:

A) establishing a nominal tension on said tape:
  1) measuring said rotational angular displacement of said supply reel from said supply tachometer;
  2) deriving reel radii and tape inertial values corresponding thereto;
  3) measuring said rotational angular displacement of said take-up reel from said take-up tachometer;
  4) deriving reel radii and tape inertial values corresponding thereto; and
  5) operating said supply reel motor and said take-up reel motor to apply a nominal tension to said tape; and B) maintaining tension control tending to maintain said tape tension constant:
  1) determining from said measured rotational angular displacement of said supply reel, the rotational angular velocity of said supply reel;
  2) determining from said determined rotational angular velocity and said derived reel radii values of said supply reel, a linear speed for said tape at said supply reel;
  3) determining from said measured rotational angular displacement of said take-up reel, the rotational angular velocity of said take-up reel;
  4) determining from said determined rotational angular velocity and said derived reel radii values of said take-up reel, a linear speed for said tape at said take-up reel;
  5) comparing said determined linear speed for said tape at said supply reel to said determined linear speed for said tape at said take-up reel, to determine a delta velocity between said linear speeds; and
  6) operating at least one of said supply reel motor and said take-up reel motor in accordance with a function of said delta velocity and said inertial values to provide a torque to at least one of said supply reel and said take-up reel tending to reduce said delta velocity.

* * * * *